United States Patent Office 3,530,196
Patented Sept. 22, 1970

3,530,196
OLEFIN DISPROPORTIONATION PROCESS
David M. Singleton, Richmond, Calif., assignor to Shell Oil Company, New York, N.Y., a corporation of Delaware
No Drawing. Filed July 25, 1968, Ser. No. 747,434
Int. Cl. C07c 3/62
U.S. Cl. 260—680
8 Claims

ABSTRACT OF THE DISCLOSURE

Olefins are disproportionated employing a catalyst composition produced by contacting a molybdenum or tungsten tetrahalide salt and an inorganic aluminum trihalide in selected molar proportions of about 3 to 30 moles of aluminum trihalide per mole of molybdenum or tungsten salt.

BACKGROUND OF THE INVENTION

Reactions of olefinic molecules in the presence of metal-containing catalysts to produce other olefinic molecules are known in the art, being frequently termed "disproportionation." A typical olefin disproportionation process is illustrated by U.S. 3,261,879, issued July 19, 1966, to Banks, wherein two similar molecules of an olefin react in the presence of certain catalysts to produce one olefin of a higher carbon number and one olefin of a lower carbon number. For example, propylene disproportionates by the process of U.S. 3,261,879 to produce ethylene and butylenes.

A variation of this disproportionation process, which might be termed "reverse disproportionation" is illustrated by the Netherlands patent application 6514985 of British Petroleum Company, Limited, published May 20, 1966, wherein, in one modification, molecules of two dissimilar olefins are reacted to form two molecules of a single olefin product; e.g., ethylene and 2-butene react to form propylene.

Another variation of the process, being conveniently termed "ring opening disproportionation" to distinguish it from other variations, is disclosed by Netherlands patent application 6702703 of Phillips Petroleum Company, published Aug. 24, 1967, wherein a cyclic olefin and an acylic olefin react to form a single product molecule. For example, ethylene reacts with cyclopentene by "ring opening disproportionation" to produce 1,6-heptadiene.

The term "disproportionation process" as herein employed is meant to include each of the above variations of disproportionation reactions.

A variety of catalysts have been employed for conducting disproportionation reactions. One type of disproportionation catalyst comprises homogeneous catalyst compositions produced by contacting a tungsten salt and a hydrocarbon soluble organoaluminum compound. Although such catalyst compositions possess a high level of catalytic activity in disproportionation reactions, the organoaluminum compound precursors are expensive and present operational difficulties during production, storage and utilization in catalyst preparation. It would be of advantage to produce active disproportionation catalysts with less expensive aluminum compounds as catalyst precursors, particularly hydrocarbon-insoluble, inorganic aluminum compounds which would produce heterogeneous catalyst compositions, i.e., catalyst compositions which are substantially insoluble in the reaction mixture, as heterogeneous catalyst compositions are generally more suitable for large-scale industrial operations. For example, heterogeneous catalyst systems do not require elaborate means for separation of catalyst composition and reaction products due to the insolubility of the catalyst composition in the reaction mixture.

SUMMARY OF THE INVENTION

It has now been found that an improved process of disproportionating olefins is obtained through the use of a catalyst composition produced by contacting a molybdenum(IV) salt or a tungsten(IV) salt and an inorganic aluminum trihalide. The catalyst composition is characterized by improved activity for ring opening disproportionation, i.e., the disproportionation of a cyclic olefin and an acylic olefin to form a single product molecule, as well as other variations of olefin disproportionation, and is a heterogeneous composition, i.e., substantially insoluble in the disproportionation reaction mixture.

DESCRIPTION OF PREFERRRED EMBODIMENTS

The olefinic reactants

The process of the invention comprises the contacting of two olefinic reactants, which may be the same olefin or different olefins, in the presence of disproportionation catalyst compositions comprising tungsten(IV) or molybdenum(IV) salts and aluminum trihalides. The olefinic reactant comprises a hydrocarbon having at least one ethylenic linkage, each carbon atom of which has a hydrogen. The olefinic reactant is acyclic, monocyclic or polycyclic of up to four rings, preferably of two rings, and is a monoolefin or is an olefinic reactant of up to three non-conjugated carbon-carbon double bonds, preferably of up to two, which comprise the only unsaturation within the molecule. When the olefinic reactant is cyclic, at least one ethylenic linkage, each carbon atom of which has a hydrogen substituent, is a portion of a carbocyclic ring of at least five carbon atoms.

A class of suitable acyclic olefinic reactants is represented by the Formula I $$RCH=CHR' \qquad (I)$$

wherein R and R' independently are hydrogen or alkyl of up to 18 carbon atoms with the total number of carbon atoms of the acrylic olefin, which total is herein termed $n$, being no more than 20.

Illustrative of acylic olefinic reactants represented by Formula I are propylene, 1-butene, 2-butene, 2-pentene, 3-hexene, 4-methyl-1-heptene, 2-decene, 6-dodecene, 3-tetradecene and 10-eicosene. In general, the preferred acyclic olefins are olefins of up to ten carbon atoms, more preferably of up to six carbon atoms, and especially preferred are acrylic internal monoolefins, i.e., those olefins wherein both R and R' groups are alkyl.

A class of suitable cyclic olefinic reactants is represented by Formula II

(II)

wherein A is a divalent hydrocarbon moiety of from three to ten carbons and of up to three ethylenic double bonds which are portions of carbocyclic rings and is selected so that the carbon atoms depicted in the Formula II are members of a carbocyclic ring of at least five carbon atoms. The total number of carbon atoms of the cyclic olefinic reactant of Formula II which total is herein termed $m$, is therefore from five to twelve.

Illustrative monocyclic olefinic reactants of Formula II include cyclopentene, cyclohexene, cycloheptene, cyclooctene, cyclodecene, 1,5-cyclooctadiene, 1,6-cyclodecadiene and 1,5,9-cyclododetriene, whereas illustrative polycyclic olefinic reactants are illustrated by bicyclo-(2.2.1)-hepta-2,5-diene, bicyclo(2.2.1)hept-2-ene, tricyclo(4.2.1.0$^{2,5}$)non-7-ene, tricyclo(5.2.1.0$^{2,6}$)deca-3,8-diene, bicyclo(2.2.2.)oct-2-ene, bicyclo(2.2.2)-octa-2,5-diene, bicyclo(3.3.0)oct-2-ene, and quadricyclo(2.2.1.2$^{2,6}$.0$^{3,5}$)non-8-ene. Particularly satisfactory results are obtained when the cyclic olefinic reactant is a monocyclic or a bicyclic olefinic reactant of up to two ethylenic linkages and most preferred are the monocyclic, monoolefinic reactants of from five to eight carbon atoms.

When two different olefinic reactants are employed in the disproportionation process, the molar ratio of one olefinic reactant to the other olefinic reactant is not critical, and up to a 20-fold excess, preferably up to a 10-fold excess of one olefinic reactant can be employed.

Catalyst composition

The catalyst composition employed for the olefin disproportionation processes of the invention comprises the product of contacting a molybdenum(IV) salt or a tungsten(IV) salt and an inorganic aluminum trihalide. Although compositions produced from substantially equimolar amounts of an aluminum trihalide and a molybdenum or tungsten salt are operable as disproportionation catalysts, the production of the highly active, heterogeneous catalyst compositions of the invention requires the use of aluminum trihalide in an amount sufficient to provide at least about 2 moles of excess aluminum trihalide per mole of molybdenum or tungsten salt. In general, aluminum trihalide amounts as high as about 50 moles per mole of molybdenum or tungsten salt are satisfactory, although amounts of aluminum trihalide from 3 moles to about 30 moles per mole of molybdenum or tungsten salt are preferred.

Aluminum trihalides of halogens of atomic numbers from 9 to 53, inclusive, suitable for preparing the catalyst composition are aluminum trifluoride, aluminum trichloride, aluminum tribromide and aluminum triiodide. It is generally preferred, however, to employ aluminum trichloride.

Although a variety of molybdenum(IV) salts and tungsten(IV) salts such as the acetylacetonate, sulfate, nitrate, oxyhalides or the like is operable as the catalyst precursor, superior results are obtained when the molybdenum(IV) salt or tungsten(IV) salt is a molybdenum tetrahalide or tungsten tetrahalide. Exemplary molybdenum tetrahalides include molybdenum tetrafluoride, molybdenum tetrachloride, molybdenum tetrabromide and molybdenum tetraiodide; and exemplary tungsten tetrahalides include tungsten tetrafluoride, tungsten tetrachloride, tungsten tetrabromide and tungsten tetraiodide. Molybdenum tetrachloride and tungsten tetrachloride are preferably employed as precursors for preparing the catalyst compositions.

Molybdenum tetrahalides and tungsten tetrahalides are well characterized compounds which are prepared by more or less conventional procedures as disclosed, for example, by Kleinberg et al., "Inorganic Chemistry," Heath and Company, Boston, page 524.

One method of preparing molybdenum and tungsten tetrahalide comprises hydrogenating the corresponding pentahalide or hexahalide salt at elevated temperatures and pressure. For example, the hydrogenation of molybdenum pentachloride produces molybdenum tetrachloride and the hydrogenation of tungsten hexachloride produces tungsten tetrachloride. The hydrogenation is generally conducted in the presence of an inert reaction diluent which is liquid at reaction temperature and pressure. Illustrative of suitable reaction diluents are hydrocarbons free from aliphatic unsaturation such as hexane, decane, cyclohexane, isooctane, decahydronaphthalene, benzene and toluene. Preferred reaction diluents comprise monocyclicaromatic hydrocarbons of from 6 to 12 carbon atoms, especially benzene. In general, the hydrogenation is conducted at a temperature of about 100° C. to about 250° C. and at a hydrogen pressure of about 100 p.s.i.g. to about 1000 p.s.i.g. After the hydrogenation has been conducted for the desired contact time, which typically varies from one to several hours, the molybdenum or tungsten tetrahalide salt is separated from the diluent, if desired, before contacting with the aluminum trihalide by conventional techniques such as filtration and decantation. In most instances, however, it is more convenient to directly contact the mixture of diluent and tetrahalide salt with the aluminum trihalide wherein the presence of a reaction diluent is also desired.

In an alternative procedure, molybdenum tetrahalide and tungsten tetrahalide are prepared by reduction of the corresponding pentahalide or hexahalide, respectively, with stannous halides according to the general procedure employed by Mallock, Inorg. Nucl. Chem. Letters, 3, 441 (1967), for preparing molybdenum trichloride from molybdenum pentachloride and stannous chloride. The reduction is conducted by contacting a pentahalide or hexahalide with substantially the stoichiometric amount of stannous halide required to reduce the pentahalide or hexahalide salt to the tetrahalide salt. For example, the reduction of a hexachloride salt to a tetrachloride salt requires a substantially equimolar amount of stannous chloride based on the hexachloride salt. On the other hand, the reduction of a pentachloride salt to a tetrachloride salt requires a substantially one-half equimolar amount of stannous chloride based on the pentachloride salt. The tungsten hexahalide or molybdenum pentahalide is generally contacted with the required amount of stannous halide at elevated temperatures, e.g., from about 250° to about 300° C. for a reaction time which typically varies from about several minutes to several hours. After contacting for the desired reaction period, the molybdenum or tungsten tetrahalide-containing product mixture is evacuated to about 1 mm. of Hg or lower to remove the resulting stannic halide product and any unreacted and volatile material such as excess pentahalide or hexahalide. In most instances, however, it is more convenient to directly contact the molybdenum or tungsten tetrahalide-containing product mixture with aluminum trihalide to prepare the catalyst composition as the presence of stannic halide or any unreacted components cause no detrimental effects in the disproportionation reactions.

Other suitable procedures for producing molybdenum and tungsten tetrahalides include:

(1) Preparation of molybdenum tetrachloride by reaction of molybdenum pentachloride in refluxing benzene as disclosed by Larson et al., Inorg. Chem., 3, 285 (1964).

(2) Preparation of molybdenum and tungsten tetrachloride by reduction of the corresponding pentahalide or hexahalide with aluminum as disclosed by McCarley et al., Inorg. Chem. 3, 1232 (1964).

(3) Preparation of molybdenum tetrachloride by reaction of the molybdenum dioxide and a solution of chlorine in carbon tetrachloride as disclosed by Klienberg et al., "Inorganic Chemistry," Health and Company, Boston, page 524.

(4) Preparation of molybdenum tetrachloride by irradiation of molybdenum pentachloride in tetrachloroethylene as disclosed by Brown et al., Inorg. Chem. 7, 1227 (1968).

In general, any known prior art method such as those described above are suitably employed for preparing the molybdenum or tungsten tetrahalide catalyst precursors. In the preparative methods described above, a small amount of the molybdenum or tungsten trihalide salt is often concomitantly produced along with the desired molybdenum or tungsten tetrahalide salt. In most instances, however, it is convenient to directly employ the mixture of tetrahalide and trihalide salt as no detrimental effects are incurred by incorporating trihalide salt into the catalyst composition.

In certain modifications, it has been found advantageous to include within the catalyst compositions a small amount of a triarylphosphine modifier in addition to the active catalyst materials as described above. Triarylphosphines suitably employed as modifiers comprise those derivatives having 18 to 60 carbon atoms and represented by the formula $R_3P$ wherein R independently is a hydrocarbon aromatic moiety of up to 20 carbon atoms, i.e., aryl or alkaryl, preferably containing 1 to 2 separate or fused 6-carbon aromatic rings, such as phenyl, naphthyl, p-phenylphenyl, tolyl, xylyl, p-ethylphenyl and 2,4-dipropylphenyl. Illustrative of triarylphosphines of above formula $R_3P$ therefore include triphenylphosphine, tritolylphosphine, naphthyldiphenylphosphine, phenyldixylylphosphine, tris(p-butylphenyl)phosphine and trixylylphosphine. Particularly preferred as modifier is triphenylphosphine.

The amount of triarylphosphine modifier is not critical, and no modifier is required. When present, ratios of triarylphosphine to aluminum trihalide of from about 1:10 to about 1:1 are satisfactory. The use of triarylphosphine is preferred when terminal olefins are employed in the disproportionation processes.

The catalyst composition is prepared by simply contacting the molybdenum tetrahalide or tungsten tetrahalide, aluminum trihalide and triarylphosphine, if employed, at any convenient temperature or pressure. Suitable reaction temperatures vary from 20° C. to about 200° C. and suitable reaction pressures vary from about 15 p.s.i.g. to about 1000 p.s.i.g. In order to insure intimate contacting, it is generally preferred to use an inert reaction diluent which is liquid at contact temperatures and pressures. Illustrative of suitable reaction diluents are hydrocarbons free from aliphatic unsaturation such as saturated acyclic or alicyclic alkanes of from 6 to 12 carbon atoms, e.g., hexane, isooctane, decane, cyclohexane; and monoaromatic hydrocarbons of from 6 to 12 carbon atoms, e.g., benzene and toluene. The resulting mixture of diluent and catalyst composition is generally directly employed in the disproportionation reactions wherein the presence of a reaction diluent is also desired.

The catalyst compositions are suitably employed as unsupported materials. In certain modifications, however, it has been found desirable to employ the catalyst composition supported on inorganic, solid catalyst carriers which are normally solid under reaction conditions and are heterogeneous, i.e., are substantially insoluble in the disproportionation reaction medium. Illustrative of suitable inorganic, solid catalyst carriers are inorganic acidic oxides such as alumina and inorganic materials known as siliceous refractory oxides. Suitable siliceous refractory oxides include synthetic components as well as acid treated clays and similar materials such as kieselguhr or crystalline macroreticular aluminosilicates known in the art as molecular sieves. In general, synthetic siliceous catalyst carriers are preferred over natural occurring materials or molecular sieves, and exemplary synthetic siliceous refractory catalyst carriers include silica-alumina, silica-magnesia, silica-alumina-titania, silica-alumina-zirconia, silica-titania-zirconia, silica-magnesia-alumina and the like. A particularly preferred siliceous catalyst carrier of this type is silica-alumina.

When the catalyst composition is supported, the amount of catalyst composition to carrier is not critical. In general, amounts of catalyst composition from about 0.1% to about 20% by weight, based on the catalyst carrier, are satisfactory. The catalyst composition is introduced onto the carrier in any suitable manner. In one modification, the supported catalyst composition is prepared by intimately contacting the pre-formed catalyst composition and the carrier in an inert diluent, preferably the same inert diluent employed for preparing the catalyst composition. In another modification, the catalyst compositions can be prepared directly on the catalyst carrier support surface by contacting the catalyst composition precursors in the presence of the catalyst carrier in a suitable inert diluent.

The reaction conditions

The disproportionation process is conducted by contacting, in liquid phase, the olefinic reactants, the catalyst composition, the triarylphosphine, if employed, and a reaction diluent which is the same or is similar to the diluent utilized in the production of the catalyst composition. In most instances, added diluent is used in amounts up to about 5 moles of diluents per mole of olefinic reactants. The disproportionation process is conducted in an inert reaction environment so that the reaction conditions are substantially anhydrous and substantially oxygen-free.

The precise method of establishing olefin/catalyst contact is not critical. In one modification, the entire amounts of reaction components are charged to an autoclave, and the reaction mixture is maintained with agitation at reaction temperature and pressure for the desired reaction period. Another modification comprises passing, in a continuous manner, the olefinic reactants in liquid phase solution in the reaction diluent through a reaction zone in which the catalyst composition is maintained. By any modification, the disproportionation process is conducted at moderate temperatures and pressures. Suitable reaction temperatures vary from 0° C. to about 200° C., but preferably from about 20° C. to about 110° C. The reaction is conducted at or above atmospheric pressure. The precise pressure is not critical, so long as the reaction mixture is maintained substantially in a non-gaseous phase. Typical pressures vary from about 1 atmosphere to about 80 atmospheres.

At the conclusion of reaction, the product mixture is separated and the olefinic products are recovered by conventional methods such as fractional distillation, selective extraction, filtration and the like. The reaction diluent, the catalyst composition and any unreacted olefin feed are recycled for further utilization.

The products

According to the process of invention two olefinic reactants are disproportionated to a product comprising olefin(s) having a total number of carbon atoms equal to the sum of the carbon atoms of the two olefinic reactants and having a number of ethylenic linkages equal to the sum of the ethylenic double bonds of the reactants.

One variation of the process comprises the disproportionation of two molecules of the same olefinic reactant. The reaction of two molecules of an acyclic olefin of Formula I generally produces one olefin of a higher carbon number and one olefin of a lower carbon number as depicted in Equation 1

wherein R and R' have the previously stated significance. If R and R' represent identical groups, it is appreciated that the disproportionation reaction will not cause any skeletal changes as the products RCH=CHR and

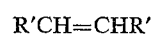

will be equivalent to R'CH=CHR. By way of specific illustration, the reaction of two molecules of propylene produces ethylene and 2-butene. However, the reaction of two molecules of 2-butene produces two molecules of 2-butene. The reaction of two molecules of a cyclic olefinic reactant of Formula II, however, produces a single cyclic olefin produced as depicted in Equation 2

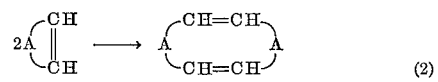

By way of specific illustration, the reaction of two molecules of cyclooctene produces 1,9-cyclohexadecadiene.

Another variation of the process comprises the disproportionation of two different acyclic olefinic reactants. By way of specific illustration, the reaction of 2-butene and 3-hexene produces two molecules of 2-pentene.

Still another variation of the process is "ring-opening" disproportionation wherein an acyclic olefinic reactant represented by Formula I is contacted with a cyclic olefinic reactant represented by Formula II. The product of "ring-opening" is a single olefinic compound with one less carbocyclic ring than the cyclic olefinic reactant of Formula II. In terms of the Formulas I and II, the product is represented by Formula III

(III)

wherein R, R' and A have the previously stated significance. By way of specific illustration, from reaction of 2-butene and cyclopentene is produced 2,7-nonadiene. Other typical products include 2,8-decadiene produced by reaction of cyclohexene and 2-butene, 3,8-undecadiene produced from 3-hexene and cyclopentene, 1,5,9-decatriene produced by reaction of ethylene and 1,5-cyclooctadiene, and 1,4-divinylcyclohexane from ethylene and bicyclo (2.2.2)oct-2-ene.

Ring opening disproportionation is the preferred variation of the process of the invetnion. In "ring opening" disproportionation, the cyclic olefinic reactant is preferably a monocyclic or a bicyclic olefinic reactant of up to two ethylenic linkages and most preferably is a monocyclic, monoolefinic reactant of from five to eight carbon atoms, and the acyclic olefinic reactant is preferably an internal olefin which is symmetrical about the double bond, i.e., those olefins wherein both R and R' groups are alkyl and R=R'.

The molar ratio of cyclic olefinic reactant to the acyclic olefin in ring opening disproportionation is not critical, although it is frequently useful to employ a molar excess of the acyclic olefin. Molar ratio of acyclic olefin to cyclic olefinic reactant from about 1:1 to about 20:1 are satisfactory with molar ratios from about 1:1 to about 10:1 being preferred.

It is appreciated that an olefinic product produced by any variations of the disproportionation process can undergo further disproportionation with another olefin present in the reaction mixture. For example, 1,6-heptadiene produced from reaction of cyclopentene and ethylene can react with another molecule of cyclopentene to produce 1,6,11-dodecatriene.

The olefinic products, for the most part, have established utility as precursors of polymers, e.g., as the third component of ethylene-propylene terpolymers useful as synthetic elastomers. Cleavage of the ethylenic bonds of polyolefinic products as by ozonization produces di- or polycarboxylic acids which are reacted with diamines, e.g., hexamethylenediamine, to form nylons which are useful in synthetic fibers. The olefinic products are converted to secondary and tertiary alcohols as by sulfuric acid-catalyzed hydration. Alternatively, the olefinic products are converted by conventional "Oxo" processes to aldehydes which are hydrogenated with conventional catalysts to the corresponding alcohols. The $C_{12}$–$C_{20}$ alcohols thereby produced are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride.

To further illustrate the improved process of the invention and the novel catalyst composition therefor, the following examples are provided. It should be understood that the details thereof are not to be regarded as limitations as they may be varied as will be understood by one skilled in this art.

EXAMPLE I (A) A sample of tungsten tetrachloride was prepared by contacting 1.0 g. of tungsten hexachloride, 50 ml. of benzene and 500 p.s.i.g. of hydrogen in an autoclave at a temperature of 150° C. for 2½ hours. The resulting tungsten tetrachloride-containing product mixture was a red-brown solution containing a fine brown suspension.

(B) A 2 ml. sample of the tungsten tetrachloride-containing product mixture prepared in Example I(A), 0.3 g. of aluminum trichloride, 10 ml. of benzene, 5 ml. of 2-pentene were charged to a glass reactor and stirred at a temperature of about 25° C. for about 15 minutes. Gas chromatographic analysis of the resulting reaction mixture showed the presence of 2-butene, 2-pentene and 3-hexene in the molar ratio of 1:2:1.

(C) A 1 ml. sample of the tungsten tetrachloride-containing product mixture of Example I(A), 0.3 g. of aluminum chloride, 0.3 g. of triphenylphosphine and 30 ml. of benzene were charged to an autoclave. The autoclave was then cooled in a Dry Ice-alcohol bath while 20 g. of 2-butene and 3 ml. of cyclooctene were charged. The reaction mixture was then allowed to warm to about 25° C. and stirred for 2 days after which time the conversion of cyclooctene was greater than 99%. Analysis of the resulting product mixture showed the presence of 2,10-dodecadiene arising from the ring opening disproportionation of cyclooctene with 2-butene.

EXAMPLE II (A) A sample of molybdenum tetrachloride was prepared by heating a mixture of 9.1 g. of molybdenum pentachloride and 3.2 g. of stannous chloride in a glass reactor at temperature of 280° C. for 1 hour.

(B) A 0.5 g. sample of the molybdenum tetrachloride prepared in Example II(A) was contacted with 0.5 g. of aluminum chloride in about 15 ml. of benzene. The resulting catalyst composition-containing mixture was contacted with 10 ml. of 2-pentene in an autoclave at a temperature of 25° C. for 20 minutes. Gas chromatographic analysis of the resulting reaction mixture showed the presence of 2-butene and 3-hexene in the molar ratio of 1:4:1.

(C) A sample of the molybdenum tetrachloride prepared in Example II(A) is treated with aluminum chloride, and the resulting catalyst composition is contacted with a mixture of bicyclo(2.2.1)hept-2-ene and 2-butene in an autoclave by a procedure similar to Example II(B). Gas chromatographic analysis of the reaction mixture shows a good yield of 1,3-dipropenylcyclopentane.

EXAMPLE III (A) A sample of tungsten tetrachloride was prepared by contacting 11.9 g. of tungsten hexachloride and 0.54 g. of aluminum in an autoclave at a temperature of 290° C. for 4 hours.

(B) A 0.3 g. sample of tungsten tetrachloride prepared in Example III(A) was treated with 0.3 g. of aluminum chloride in 10 ml. of benzene, and the resulting catalyst composition was contacted with 2-pentene by a procedure similar to Example II(B). Analysis of the reaction mixture showed the presence of 2-butene, 2-pentene and 3-hexene in the molar ratio of 1:4:1.

I claim as my invention:
1. The process of producing olefinic compounds by contacting in liquid phase at a temperature of about 0° C. to about 200° C. at least two olefinic reactants selected from the group consisting of acyclic hydrocarbon monoolefin wherein each carbon atom of the olefinic linkage has at least one hydrogen substituent and cyclic hydrocarbon olefin of up to 4 carbocyclic rings, of up to 12 carbon atoms and up to 3 ethylenic linkages, the carbon atoms of at least one ethylenic linkage each having a hydrogen substituent and being members of a carbocyclic ring of at least 5 carbon atoms, in the presence of a catalyst composition produced by intimately contacting a molybdenum or tungsten tetrahalide salt with an aluminum trihalide, the molar ratio of aluminum trihalide to molybdenum or tungsten being from about 3:1 to about 30:1.

2. The process of claim 1 wherein the acyclic monoolefin reactant and the cyclic olefin reactant are contacted, the molar ratio of acyclic olefin to cyclic olefin being from about 1:1 to about 20:1.

3. The process of claim 2 wherein the acyclic monoolefin is a monoolefin of up to 6 carbon atoms and is symmetrical about the carbon-carbon double bond and the cyclic reactant has up to 2 carbocyclic rings and up to 2 ethylenic linkages.

4. The process of claim 3 wherein the cyclic olefinic reactant is a monocyclic, monoolefinic reactant of from 5 to 8 carbons.

5. The process of claim 1 wherein the catalyst composition is supported on an inorganic oxide catalyst support, the amount of catalyst composition being from about 0.1% to about 20% by weight based on the catalyst support.

6. The process of claim 1 wherein the catalyst composition is produced by contacting the molybdenum or tungsten salt and the aluminum trihalide in the presence of a triarylphosphine of the formula $R_3P$ wherein R independently is a hydrocarbon aromatic moiety of up to 20 carbon atoms, the molar ratio of triarylphosphine to aluminum trihalide being from about 1:10 to about 1:1.

7. The process of claim 1 wherein the molybdenum or tungsten tetrahalide is prepared by hydrogenation of the corresponding pentahalide or hexahalide salt of molybdenum or tungsten at a hydrogen pressure of about 100 p.s.i.g. to about 1000 p.s.i.g.

8. The process of claim 1 wherein two different acyclic monoolefins are contacted

References Cited

UNITED STATES PATENTS

| | | | |
|---|---|---|---|
| 3,130,003 | 4/1964 | Tornqvist et al. | 252—442 X |
| 3,278,258 | 10/1966 | Tornqvist et al. | 252—442 X |
| 3,413,367 | 11/1968 | Kopsch | 252—442 X |

OTHER REFERENCES

Calderon et al.: Tetrahedron Letters, No. 34, pp. 3327–3329 (1967).

McCarley et al.: Inorganic Chemistry, No. 3, pp. 1232–1236 (1964).

PAUL M. COUGHLAN, JR., Primary Examiner

U.S. Cl. X.R.

252—437, 442; 260—666, 683